(12) United States Patent
Schneider et al.

(10) Patent No.: US 6,729,425 B2
(45) Date of Patent: May 4, 2004

(54) ADJUSTABLE REINFORCED STRUCTURAL ASSEMBLY AND METHOD OF USE THEREFOR

(75) Inventors: Dean Jeffrey Schneider, Washington, MI (US); Jason Ironsides, Almont, MI (US)

(73) Assignee: L&L Products, Inc., Romeo, MI (US)

( * ) Notice: Subject to any disclaimer, the term of this patent is extended or adjusted under 35 U.S.C. 154(b) by 106 days.

(21) Appl. No.: 09/974,017

(22) Filed: Oct. 10, 2001

(65) Prior Publication Data

US 2003/0042056 A1 Mar. 6, 2003

Related U.S. Application Data

(60) Provisional application No. 60/317,201, filed on Sep. 5, 2001.

(51) Int. Cl.[7] .......................... B60R 16/04; B62D 7/22; B60J 7/00; B25G 3/36; F16M 1/00
(52) U.S. Cl. ................. 180/68.5; 280/784; 296/187.02; 403/401.9; 403/28; 248/680
(58) Field of Search .................... 180/68.5, 65.1, 180/65.2; 280/784; 296/188, 187.02, 187.03, 187.09, 187.1; 224/544, 556; 220/8; 105/396, 51; 403/401.9, 28; 429/96, 97, 100; 264/46.5, 46.4, 261; 248/680; 156/78, 79, 83, 293

(56) References Cited

U.S. PATENT DOCUMENTS

| | | | |
|---|---|---|---|
| 1,814,677 A | | 7/1931 | Fennema |
| 3,649,375 A | | 3/1972 | Venkatesan |
| 3,868,796 A | | 3/1975 | Bush |
| 4,029,128 A | | 6/1977 | Yamagishi |
| 4,083,384 A | | 4/1978 | Horne et al. |
| 4,378,395 A | | 3/1983 | Asoshina et al. |
| 4,440,434 A | | 4/1984 | Celli |
| 4,451,518 A | * | 5/1984 | Miura et al. ................. 428/137 |
| 4,463,870 A | | 8/1984 | Coburn, Jr. et al. |
| 4,506,748 A | * | 3/1985 | Thomas ..................... 180/68.5 |
| 4,508,794 A | * | 4/1985 | Wright ........................ 429/100 |

(List continued on next page.)

FOREIGN PATENT DOCUMENTS

| | | |
|---|---|---|
| DE | 29 19 046 | 11/1980 |
| DE | 0 236 291 | 9/1987 |

(List continued on next page.)

OTHER PUBLICATIONS

International Search Report dated Nov. 4, 2002.
Copending U.S. application Ser. No. 09/655,965 filed Sep. 6, 2000.

(List continued on next page.)

*Primary Examiner*—Brian L. Johnson
*Assistant Examiner*—G B Klebe
(74) *Attorney, Agent, or Firm*—Dobrusin & Thennisch PC

(57) ABSTRACT

A reinforced structural assembly and a method of using the assembly for reinforcing components of an automotive vehicle. The assembly generally includes a first member and a second member with a reinforcement material intermediate the first and second member. According to the method, the assembly is placed in a cavity of an automotive vehicle and the reinforcement material is expanded to promote connection between the first member and a surface defining the cavity and to promote connection between the second member and another surface defining the cavity.

20 Claims, 5 Drawing Sheets

U.S. PATENT DOCUMENTS

| | | |
|---|---|---|
| 4,610,836 A | 9/1986 | Wycech |
| 4,695,343 A | 9/1987 | Wycech |
| 4,732,806 A | 3/1988 | Wycech |
| 4,751,249 A | 6/1988 | Wycech |
| 4,769,391 A | 9/1988 | Wycech |
| 4,769,951 A | 9/1988 | Kaaden |
| 4,813,690 A | 3/1989 | Coburn, Jr. |
| 4,836,516 A | 6/1989 | Wycech |
| 4,853,270 A | 8/1989 | Wycech |
| 4,861,097 A | 8/1989 | Wycech |
| 4,898,630 A | 2/1990 | Kitoh et al. |
| 4,901,395 A | 2/1990 | Semrau |
| 4,901,500 A | 2/1990 | Wycech |
| 4,908,930 A | 3/1990 | Wycech |
| 4,922,596 A | 5/1990 | Wycech |
| 4,923,902 A | 5/1990 | Wycech |
| 4,946,737 A | 8/1990 | Lindeman et al. |
| 4,978,562 A | 12/1990 | Wycech |
| 4,984,406 A | 1/1991 | Friesen |
| 4,995,545 A | 2/1991 | Wycech |
| 5,040,803 A | 8/1991 | Cieslik et al. |
| 5,072,952 A | 12/1991 | Irrgeher et al. |
| 5,086,860 A * | 2/1992 | Francis et al. ............ 180/68.5 |
| 5,102,188 A | 4/1992 | Yamane |
| 5,124,186 A | 6/1992 | Wycech |
| 5,213,391 A | 5/1993 | Takagi |
| 5,266,133 A | 11/1993 | Hanley et al. |
| 5,288,538 A * | 2/1994 | Spears ........................ 428/115 |
| 5,358,397 A | 10/1994 | Ligon et al. |
| 5,373,027 A | 12/1994 | Hanley et al. |
| 5,382,397 A | 1/1995 | Turner, Jr. |
| 5,506,025 A | 4/1996 | Otto et al. |
| 5,547,036 A * | 8/1996 | Gawaskar et al. ......... 180/68.5 |
| 5,575,526 A | 11/1996 | Wycech |
| 5,577,784 A | 11/1996 | Nelson |
| 5,631,027 A | 5/1997 | Takabatake |
| 5,642,914 A | 7/1997 | Takabatake |
| 5,704,644 A * | 1/1998 | Jaggi ......................... 280/796 |
| 5,707,098 A | 1/1998 | Uchida et al. |
| 5,755,486 A | 5/1998 | Wycech |
| 5,766,719 A | 6/1998 | Rimkus |
| 5,806,915 A | 9/1998 | Takabatake |
| 5,806,919 A | 9/1998 | Davies |
| 5,819,408 A | 10/1998 | Catlin |
| 5,851,626 A | 12/1998 | McCorry et al. |
| 5,871,849 A | 2/1999 | Lepine |
| 5,878,784 A | 3/1999 | Sales et al. |
| 5,884,960 A | 3/1999 | Wycech |
| 5,888,600 A | 3/1999 | Wycech |
| 5,894,071 A | 4/1999 | Merz et al. |
| 5,901,752 A | 5/1999 | Lundman |
| 5,902,656 A | 5/1999 | Hwang |
| 5,931,474 A | 8/1999 | Chang et al. |
| 5,932,680 A | 8/1999 | Heider |
| 5,941,597 A | 8/1999 | Horiuchi et al. |
| 5,985,435 A | 11/1999 | Czaplicki et al. |
| 5,988,734 A | 11/1999 | Longo et al. |
| 5,992,923 A | 11/1999 | Wycech |
| 6,003,274 A | 12/1999 | Wycech |
| 6,006,484 A | 12/1999 | Geissbuhler |
| 6,033,300 A | 3/2000 | Schneider |
| 6,050,630 A | 4/2000 | Hochet |
| 6,053,210 A | 4/2000 | Chapman et al. |
| 6,058,673 A | 5/2000 | Wycech |
| 6,059,342 A | 5/2000 | Kawai et al. |
| 6,068,424 A | 5/2000 | Wycech |
| 6,073,991 A | 6/2000 | Naert |
| 6,079,180 A | 6/2000 | Wycech |
| 6,092,864 A | 7/2000 | Wycech et al. |
| 6,096,403 A | 8/2000 | Wycech |
| 6,099,948 A | 8/2000 | Pever, Jr. |
| 6,103,341 A | 8/2000 | Barz et al. |
| 6,103,784 A | 8/2000 | Hilborn et al. |
| 6,129,410 A | 10/2000 | Kosaraju et al. |
| 6,131,897 A | 10/2000 | Barz et al. |
| 6,135,542 A | 10/2000 | Emmelmann et al. |
| 6,146,565 A | 11/2000 | Keller |
| 6,149,227 A | 11/2000 | Wycech |
| 6,150,428 A | 11/2000 | Hanley, IV et al. |
| 6,165,588 A | 12/2000 | Wycech |
| 6,168,226 B1 | 1/2001 | Wycech |
| 6,174,932 B1 | 1/2001 | Pachl et al. |
| 6,189,953 B1 | 2/2001 | Wycech |
| 6,196,621 B1 | 3/2001 | VanAssche et al. |
| 6,197,403 B1 | 3/2001 | Brown et al. |
| 6,199,940 B1 | 3/2001 | Hopton et al. |
| 6,232,433 B1 | 5/2001 | Narayan |
| 6,233,826 B1 | 5/2001 | Wycech |
| 6,237,304 B1 | 5/2001 | Wycech |
| 6,244,601 B1 | 6/2001 | Buchholz et al. |
| 6,247,287 B1 | 6/2001 | Takabatake |
| 6,253,524 B1 | 7/2001 | Hopton et al. |
| 6,263,635 B1 | 7/2001 | Czaplicki |
| 6,270,600 B1 | 8/2001 | Wycech |
| 6,272,809 B1 | 8/2001 | Wycech |
| 6,276,105 B1 | 8/2001 | Wycech |
| 6,277,898 B1 | 8/2001 | Pachl et al. |
| 6,281,260 B1 | 8/2001 | Hanley, IV et al. |
| 6,287,666 B1 | 9/2001 | Wycech |
| 6,290,013 B1 * | 9/2001 | Bienenstein, Jr. .......... 180/68.5 |
| 6,296,298 B1 | 10/2001 | Barz |
| 6,303,672 B1 | 10/2001 | Papalos et al. |
| 6,305,136 B1 | 10/2001 | Hopton et al. |
| 6,311,452 B1 | 11/2001 | Barz et al. |
| 6,315,938 B1 | 11/2001 | Jandali |
| 6,319,964 B1 | 11/2001 | Blank et al. |
| 6,321,793 B1 | 11/2001 | Czaplicki et al. |
| 6,332,731 B1 | 12/2001 | Wycech |
| 6,341,467 B1 | 1/2002 | Wycech |
| 6,348,513 B1 | 2/2002 | Hilborn et al. |
| 6,357,819 B1 * | 3/2002 | Yoshino .................... 296/189 |
| 6,358,584 B1 | 3/2002 | Czaplicki |
| 6,368,438 B1 | 4/2002 | Chang et al. |
| 6,372,334 B1 | 4/2002 | Wycech |
| D457,120 S | 5/2002 | Broccardo et al. |
| 6,382,635 B1 | 5/2002 | Fitzgerald |
| 6,383,610 B1 | 5/2002 | Barz et al. |
| 6,389,775 B1 | 5/2002 | Steiner et al. |
| 6,406,078 B1 | 6/2002 | Wycech |
| 6,413,611 B1 | 7/2002 | Roberts et al. |
| 6,419,305 B1 | 7/2002 | Larsen |
| 6,422,575 B1 | 7/2002 | Czaplicki et al. |
| H2047 H | 9/2002 | Harrison et al. |
| 6,455,146 B1 | 9/2002 | Fitzgerald |
| 6,467,834 B1 | 10/2002 | Barz et al. |
| 6,471,285 B1 | 10/2002 | Czaplicki et al. |
| 6,474,722 B2 | 11/2002 | Barz |
| 6,474,723 B2 | 11/2002 | Czaplicki et al. |
| 6,475,577 B1 | 11/2002 | Hopton et al. |
| 6,482,486 B1 | 11/2002 | Czaplicki et al. |
| 6,482,496 B1 | 11/2002 | Wycech |
| 6,502,821 B2 | 1/2003 | Schneider |
| 6,519,854 B2 | 2/2003 | Blank |
| 6,523,857 B1 | 2/2003 | Hopton et al. |
| 6,523,884 B2 | 2/2003 | Czaplicki et al. |
| 6,546,693 B2 | 4/2003 | Wycech |
| 6,561,571 B1 | 5/2003 | Brennecke |
| 6,575,526 B2 | 6/2003 | Czaplicki et al. |
| 6,619,009 B2 | 9/2003 | Lupini et al. |
| 2002/0033618 A1 | 3/2002 | Kwon |
| 2002/0053179 A1 | 5/2002 | Wycech |

| | | | | | | |
|---|---|---|---|---|---|---|
| 2002/0074827 A1 | 6/2002 | Fitzgerald et al. | | WO | WO 99/61216 | 12/1999 |
| 2003/0001469 A1 | 1/2003 | Hankins et al. | | WO | WO 99/61236 | 12/1999 |
| 2003/0057737 A1 | 3/2003 | Bock et al. | | WO | WO 99/61237 | 12/1999 |
| 2003/0175491 A1 | 9/2003 | Wycech | | WO | WO 99/61281 | 12/1999 |
| 2003/0235675 A1 | 12/2003 | Wycech | | WO | WO 99/61287 | 12/1999 |
| | | | | WO | WO 99/64287 | 12/1999 |

FOREIGN PATENT DOCUMENTS

| | | | | | |
|---|---|---|---|---|---|
| DE | 36 27 725 A1 | 2/1988 | WO | WO 00/03894 | 1/2000 |
| DE | 90 11 147.8 | 9/1990 | WO | WO 00/12571 | 3/2000 |
| DE | 90 11 147.8 | 10/1990 | WO | WO 00/12595 | 3/2000 |
| DE | 40 28 895 C1 | 2/1992 | WO | WO 00/13876 | 3/2000 |
| DE | 93 20 333.0 | 9/1994 | WO | WO 00/13958 | 3/2000 |
| DE | 93 20 333.3 | 9/1994 | WO | WO 00/17000 | 3/2000 |
| DE | 196 35 734 A1 | 4/1997 | WO | WO 00/20483 | 4/2000 |
| DE | 197 20 109 A1 | 11/1997 | WO | WO 00/27920 | 5/2000 |
| DE | 196 44 047 A1 | 5/1998 | WO | WO 00/37230 | 6/2000 |
| DE | 196 48 164 A1 | 5/1998 | WO | WO 00/37239 | 6/2000 |
| DE | 198 12 288 C1 | 5/1999 | WO | WO 00/37241 | 6/2000 |
| DE | 197 53 658 A1 | 6/1999 | WO | WO 00/37242 | 6/2000 |
| DE | 299 04 705 U1 | 7/1999 | WO | WO 00/37243 | 6/2000 |
| DE | 198 56 255 C1 | 1/2000 | WO | WO 00/37302 | 6/2000 |
| DE | 198 58 903 A1 | 6/2000 | WO | WO 00/37554 | 6/2000 |
| EP | 628863 | 3/1947 | WO | WO 00/38863 | 7/2000 |
| EP | 628863 | 9/1949 | WO | WO 00/39232 | 7/2000 |
| EP | 0 061 131 A2 | 9/1982 | WO | WO 00/40629 | 7/2000 |
| EP | 0 061 131 | 9/1982 | WO | WO 00/40815 | 7/2000 |
| EP | 61118211 | 6/1986 | WO | WO 00/43254 | 7/2000 |
| EP | 0 236 291 A2 | 2/1987 | WO | WO 00/46461 | 8/2000 |
| EP | 0 414 302 A1 | 2/1991 | WO | WO 00/52086 | 9/2000 |
| EP | 0 453 777 A2 | 10/1991 | WO | WO 00/55444 | 9/2000 |
| EP | 0 611 778 A3 | 8/1994 | WO | WO 00/68041 | 11/2000 |
| EP | 0 611 778 B1 | 8/1994 | WO | WO 01/41950 A2 | 6/2001 |
| EP | 0 679 501 A1 | 11/1995 | WO | WO 01/54936 | 8/2001 |
| EP | 0 775 721 A1 | 5/1997 | WO | WO 01/56845 | 8/2001 |
| EP | 0 891 918 A1 | 1/1999 | WO | WO 01/57130 | 8/2001 |
| EP | 0 893 331 A1 | 1/1999 | WO | WO 01/71225 | 9/2001 |
| EP | 0 893 332 A1 | 1/1999 | WO | WO 01/83206 | 11/2001 |
| EP | 0 697 956 B1 | 6/1999 | WO | WO 01/88033 A1 | 11/2001 |
| EP | 1 072 647 A2 | 1/2001 | | | |
| EP | 1 122 156 A2 | 8/2001 | | | |
| EP | 0 893 332 B1 | 3/2002 | | | |
| EP | 1 208 954 A2 | 5/2002 | | | |
| FR | 2 539 693 | 7/1984 | | | |
| FR | 2 749 263 | 12/1997 | | | |
| GB | 2 061 196 | 5/1981 | | | |
| GB | 2 156 412 | 10/1985 | | | |
| GB | 2 197 267 | 5/1988 | | | |
| GB | 2 375 328 A | 11/2002 | | | |
| JP | 58-87668 | 6/1983 | | | |
| JP | 61118211 | 6/1986 | | | |
| JP | 01069309 | 9/1987 | | | |
| JP | 01069308 | 3/1989 | | | |
| JP | 01164867 | 6/1989 | | | |
| JP | 02206537 | 8/1990 | | | |
| JP | 5-38992 | 2/1993 | | | |
| JP | 10-53156 | 2/1998 | | | |
| JP | 2001191947 | 7/2001 | | | |
| JP | 02001191949 A | 7/2001 | | | |
| WO | WO 87/01978 | 4/1987 | | | |
| WO | WO 89/06595 | 7/1989 | | | |
| WO | WO 93/05103 | 3/1993 | | | |
| WO | WO 95/32110 | 11/1995 | | | |
| WO | WO 97/02967 | 1/1997 | | | |
| WO | WO 97/43501 | 11/1997 | | | |
| WO | WO 98/36944 | 8/1998 | | | |
| WO | WO 98/50221 | 11/1998 | | | |
| WO | WO 99/08854 | 2/1999 | | | |
| WO | WO 99/28575 | 6/1999 | | | |
| WO | WO 99/36243 | 7/1999 | | | |
| WO | WO 99/48746 | 9/1999 | | | |
| WO | WO 99/50057 | 10/1999 | | | |

OTHER PUBLICATIONS

Copending U.S. application Ser. No. 09/923,138 filed Aug. 6, 2001.

Copending U.S. application Ser. No. 10/233,919 filed Sep. 3, 2002.

Copending U.S. application Ser. No. 10/234,902 filed Sep. 4, 2002.

Copending U.S. application Ser. No. 09/584,211 filed May 31, 2000.

Copending U.S. application Ser. No. 09/655,965 filed Sep. 6, 2000.

Copending U.S. application Ser. No. 09/858,939 filed May 16, 2001.

Copending U.S. application Ser. No. 09/859,126 filed May 16, 2001.

Copending U.S. application Ser. No. 09/906,289 filed Jul. 16, 2001.

Copending U.S. application Ser. No. 09/939,152 filed Aug. 24, 2001.

Copending U.S. application Ser. No. 09/939,245 filed Aug. 24, 2001.

Copending U.S. application Ser. No. 09/982,681 filed Oct. 18, 2001.

Copending U.S. application Ser. No. 60/296,312 filed Jun. 6, 2001.

Copending U.S. application Ser. No. 09/676,725 filed Sep. 29, 2000.

Copending U.S. application Ser. No. 60/317,009 filed Sep. 4, 2001.
Copending U.S. application Ser. No. 09/428,243 filed Oct. 27, 1999.
Copending U.S. application Ser. No. 09/459,756 filed Dec. 10, 1999.
Copending U.S. application Ser. No. 09/502,686 filed Feb. 11, 2000.
Copending U.S. application Ser. No. 09/524,298 filed Mar. 14, 2000.
Copending U.S. application Ser. No. 09/524,961 filed Mar. 14, 2000.
Copending U.S. application Ser. No. 09/631,211 filed Aug. 3, 2000.
Copending U.S. application Ser. No. 09/676,335 filed Sep. 29, 2000.
Copending U.S. application Ser. No. 09/676,443 filed Sep. 29, 2000.

* cited by examiner

ADJUSTABLE REINFORCED STRUCTURAL ASSEMBLY AND METHOD OF USE THEREFOR

FIELD OF THE INVENTION

The present invention relates generally to a reinforced structural assembly for use in strengthening, stiffening or stabilizing different portions of an automotive vehicle. More particularly, the present invention relates to a reinforced structural assembly for placement in a cavity of an automotive vehicle wherein the assembly includes a first structural member generally opposing a second structural member with a layer of expandable material intermediate the members for moving each of the members toward one or more walls defining the cavity of the vehicle.

BACKGROUND OF THE INVENTION

For many years the transportation industry has been concerned with designing reinforced structural members or assemblies that do not add significantly to the weight of a vehicle. For example, U.S. Pat. Nos. 5,755,486; 4,901,500; and 4,751,249 describe prior art reinforcing devices. Generally, the reinforced structural members have used expandable materials combined with other materials for forming structural members that fit into one or more cavities of an automotive vehicle. Once the structural members are placed in the cavities the expandable materials may be expanded to secure the members in the cavities. Typically, it is desirable to maintain some degree of control over the amount of expansion experienced by the expandable materials since the amount of expansion may at least partially dictate the structural or strength properties exhibited by the materials. However, such control may be difficult since cavities of automotive vehicles tend to vary in size due to factors such as size tolerances of vehicle components and the like.

In addition to variability in size, the shapes of the cavities can cause difficulties in forming structural members that fit properly in the cavities. Moreover, the sizes of openings through which the structural members are inserted to place the structural members in the cavities may be relatively small, which may cause assembly problems for the structural members. Thus, there is a need for a reinforced structural assembly that can be effectively used in cavities that have various shapes, various sizes, variably sized openings or a combination thereof.

SUMMARY OF THE INVENTION

The present invention is directed to a structural reinforcement assembly adapted for placement in a cavity of an automotive vehicle and, more particularly, a reinforcement assembly having one or more degrees of adjustability to assist the assembly in forming a reinforcement system with components of an automotive vehicle. Generally speaking, the assembly may utilize technology and processes such as those disclosed in U.S. Pat. Nos. 4,922,596, 4,978,562, 5,124,186, and 5,884,960 and commonly owned, co-pending U.S. application Ser. Nos. 09/502,686 filed Feb. 11, 2000 and 09/524,961 filed Mar. 14, 2000, all of which are expressly incorporated by reference. The assembly generally employs a first and second member, each member including a first surface generally opposing a second surface. The assembly also typically includes reinforcement material intermediate the first and second members. The reinforcement material is preferably configured for contacting the first surfaces of the first and second members during expansion of the reinforcement material such that the second surfaces of the members form a connection with surfaces defining the cavity within an automotive vehicle. Preferably the reinforcement material is an energy absorbing medium, and a heat activated bonding material. In a particular preferred embodiment, the first and second members could be formed of injection molded nylon, injection molded polymer, or molded metal (such as aluminum, magnesium, steel and titanium, an alloy derived from the metals, and even a metallic foam). The reinforcement material may be a foamable or expandable material, which could comprise an epoxy-based resin, such as L5204, L5206, L5207, L5208 or L5209 structural foam commercially available from L & L Products of Romeo, Mich. Additional foamable or expandable materials that could be utilized in the present invention include other materials which are suitable as bonding mediums and which may be heat activated foams which activate and expand to fill a desired cavity or occupy a desired space or function when exposed to temperatures typically encountered in automotive e-coat and other paint operations. In addition, it is contemplated that the first and second members could comprise a nylon or other polymeric material as set forth in commonly owned U.S. Pat. No. 6,103,341, expressly incorporated by reference herein.

Though other heat-activated materials are possible, a preferred heat activated material is an expandable or flowable polymeric formulation, and preferably one that is activated to foam, flow or otherwise change states when exposed to the heating operation of a typical automotive assembly painting operation. For example, without limitation, in one embodiment, the polymeric foam is based on ethylene copolymer or terpolymer that may possess an alpha-olefin. As a copolymer or terpolymer, the polymer is composed of two or three different monomers, i.e., small molecules with high chemical reactivity that are capable of linking up with similar molecules. Examples of particularly preferred polymers include ethylene vinyl acetate, EPDM, or a mixture thereof. Without limitation, other examples of preferred foam formulation that are commercially available include polymer-based material commercially available from L&L Products, inc. of Romeo, Mich., under the designations as L-2105, L-2100, L-7005 or L-2018, L-7101, L-7102, L2411, L-2412, L-4141, etc. and may comprise either open or closed cell polymeric base material.

A number of other suitable materials are known in the art and may also be used for vibration reduction. One such foam preferably includes a polymeric base material, such as an ethylene-based polymer which, when compounded with appropriate ingredients (typically a blowing and curing agent), expands and cures in a reliable and predicable manner upon the application of heat or the occurrence of a particular ambient condition. From a chemical standpoint for a thermally activated material, the vibration reducing foam is usually initially processed as a flowable thermoplastic material before curing. It will cross-link upon curing, which makes the material resistant of further flow or change of final shape.

It is contemplated that the reinforcement material could be delivered and placed into contact with the assembly members, through a variety of delivery systems which include, but are not limited to, a mechanical snap fit assembly, extrusion techniques commonly known in the art as well as a mini-applicator technique as in accordance with the teachings of commonly owned U.S. Pat. No. 5,358,397 ("Apparatus For Extruding Flowable Materials"), hereby expressly incorporated by reference. In this non-limiting embodiment, the material or medium is at least partially coated with an active polymer having damping characteristics or other heat activated polymer, (e.g., a formable hot melt adhesive based polymer or an expandable structural foam, examples of which include olefinic polymers, vinyl polymers, thermoplastic rubber-containing polymers, epoxies, urethanes or the like) wherein the foamable or expandable material can be snap-fit onto the chosen surface or substrate; placed into beads or pellets for placement along the chosen substrate or member by means of extrusion; placed along the substrate through the use of baffle technology; a die-cast application according to teachings that are well known in the art; pumpable application systems which could include the use of a baffle and bladder system; and sprayable applications.

In one embodiment the assembly including the first and second members along with a suitable amount of reinforcement material intermediate the members is placed in a cavity defined within an automotive vehicle, between components such as a panel and a battery support tray or other area or substrate found in an automotive vehicle which could benefit from the structural reinforcement, vibrational reduction, noise reduction characteristics or a combination thereof found in the present invention. Once in place, the reinforcement material of the assembly may be activated to expand such that the first and second members are moved away from each other to contact the components defining the cavity.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF THE PREFERRED EMBODIMENT

Figure 4:
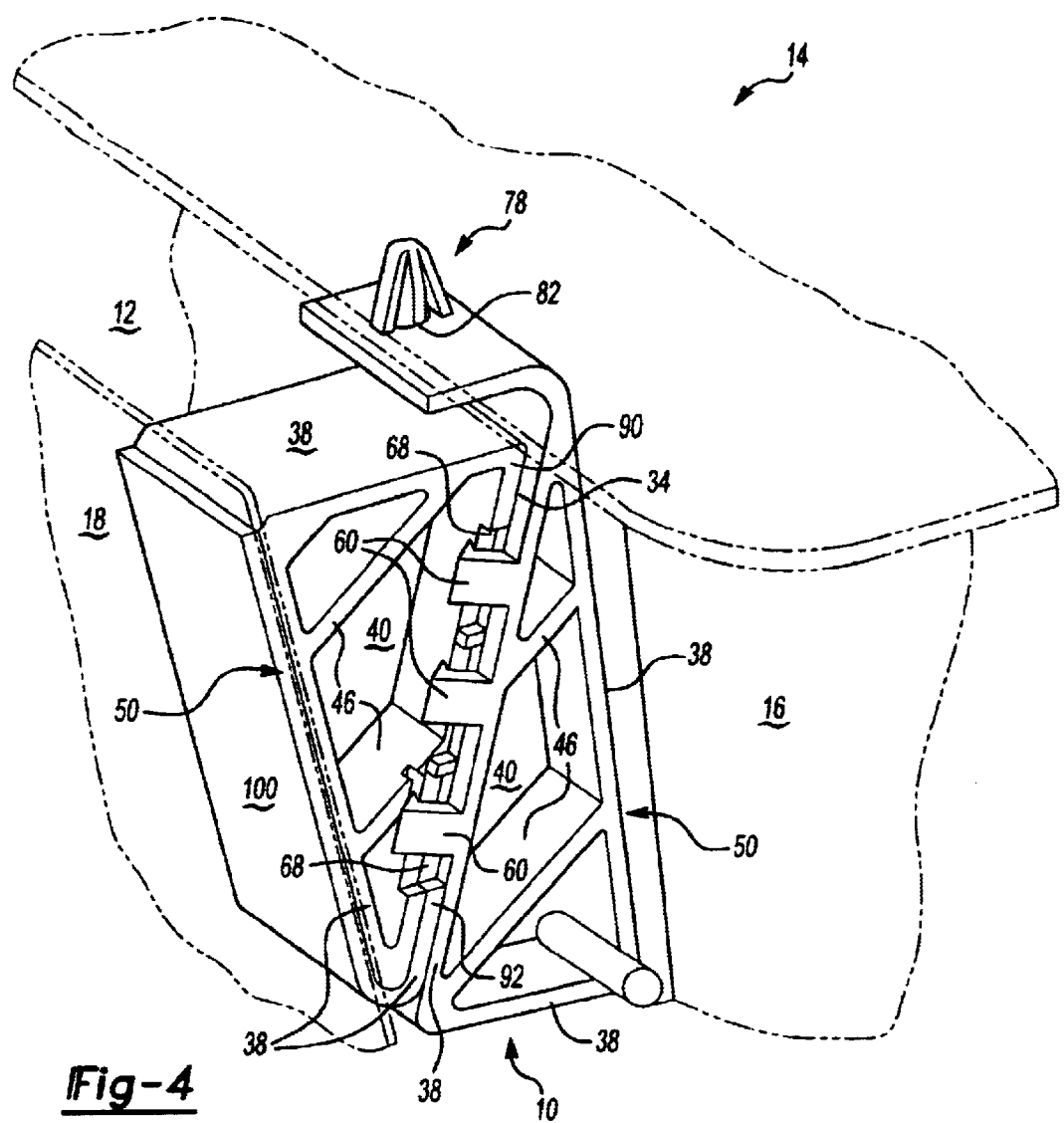
FIG. 4 is a perspective view of the reinforced structural assembly of FIG. 1 being installed within a cavity of a portion of an automotive vehicle.

FIGS. 1–4 illustrate an example of an adjustable reinforced structural assembly 10 configured for placement within a cavity 12 of an automotive vehicle (not shown) for forming a reinforced structural system 14 along with one or more components of the vehicle. Preferably, the one or more components of the vehicle at least partially define the cavity 12. As will be appreciated, the assembly 10 may be suited for placement in a variety of cavities for reinforcing a variety of components of the automotive vehicle. For purposes of illustration, without limitation, the assembly 10 is shown in FIG. 4 between a battery support tray 16 and a metal panel 18 of the vehicle.

The assembly 10 is comprised of a first member 30 and a second member 32 with a reinforcement material 34 intermediate the first and second members 30, 32. The first and second members 30, 32 are both generally "wedge" shaped and include three rectangular walls 38 connected in a triangular configuration about a generally open space 40. Each of the members 30, 32 includes a pair of ribs 46 extending from one of the walls 38, 5 through the open space 40 to another wall 38. Although, the preferred configuration of the members 30, 32 has been shown, it is contemplated that the members 30, 32 may be formed in a variety of configurations including square, rectangular, block shaped and the like. Each of the members 30, 32 may have more or less walls and may have more, less or zero ribs. Moreover, the ribs, walls or both may be extended or shortened in various directions to make the assembly 10 more suitable for a cavity into which the assembly 10 will be placed in. Additionally, the members may be substantially solid, however, preferably, the members 30, 32 are skeletal in nature (i.e., comprised of walls, ribs and the like that form a framework) to maintain a lower weight for the assembly 10.

At least one of walls 38 of each of the members 30, 32 includes an outwardly facing surface 50 for contacting components of the vehicle. As shown in FIGS. 1–4, the contacting surfaces 50 of the members 30, 32 are generally flat and are designed to complement generally flat surfaces of the battery tray 16 and the metal panel 18. However, the contacting surfaces 50 of the members 30, 32 may also be contoured to matingly correspond to other vehicular components with contoured surfaces or the contacting surfaces 50 may be formed without any particular correspondence to vehicle components.

One of the members 30, 32 (the first member 30 in the embodiment shown) or both members 30, 32 may include one or more fasteners 60 for assisting in attaching the first member 30 to the second member 32. Various fasteners 60 may be used such as bolt assemblies or other fasteners. Preferably, the fasteners 60 allow at least some degree of movement or adjustability between the members 30, 32 so that the members 30, 32 can move toward and away from each other. According to the preferred embodiment, the fasteners 60 are pairs of opposing tangs 60 that are located adjacent opposing edges 62 of one of the walls 38 of the first member 30 and the tangs 60 are configured to snap fit along edges 66 of the second member 32. As shown, the edges 66 of the second member 32 may include cavities 68 formed therein for at least partially receiving the tangs 60.

One of the members 30, 32 (again, the first member 30 in the embodiment shown) or both of the members 30, 32 may also include a fastener or fastening assembly 78 for assisting in attaching the members 30, 32 to one or more of the components of the vehicle. Again, various different fasteners may be used. In the embodiment shown, a flange 80 extends away from an interface of two walls 38 of the first member 30 and an interference-type fastener 78 (e.g., an arrowhead fastener) that is attached to the flange 80 is projected through an opening 82 in the support tray 16 for assisting in securing the assembly 10 adjacent to the tray 16.

The members 30, 32, the fasteners 60, 78 or both may be formed of a variety of material including, but not limited to, plastics, polymers, metals, fiberglass or other such materials. In a preferred embodiment, the members 30, 32 and the fasteners 60, 78 are integrally formed of a molded glass filled nylon.

Figure 1:
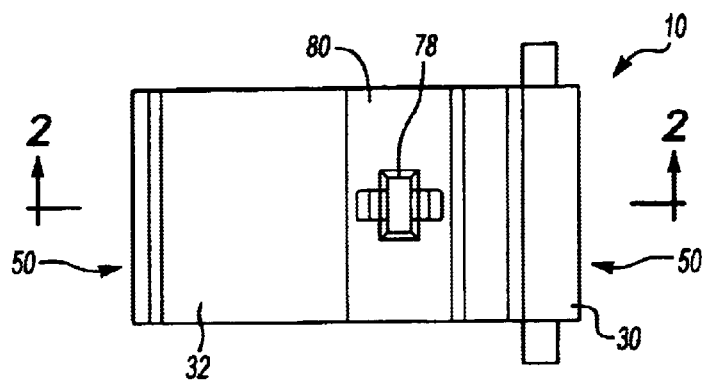
FIG. 1 is a top view of a reinforced structural assembly according to a non-limiting aspect of the present invention.
Figure 2:
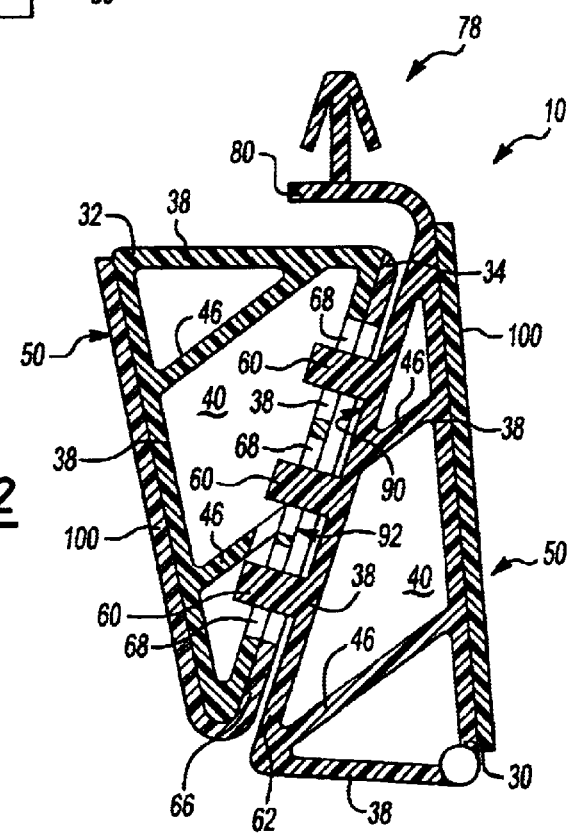
FIG. 2 is a side view of the reinforced structural assembly of FIG. 1.
Figure 3:
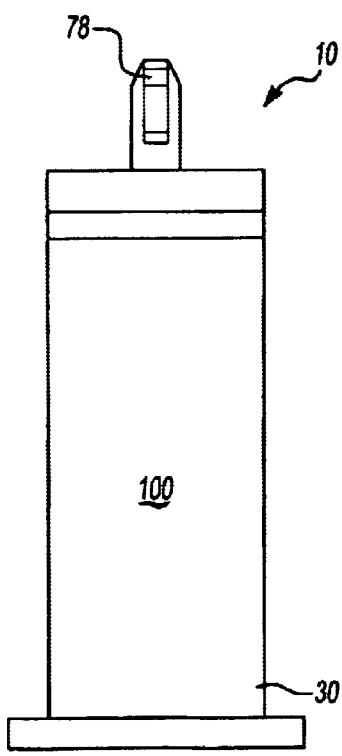
FIG. 3 is a rear view of the reinforced structural assembly of FIG. 1.

The reinforcement material 34 is preferably an expandable material that may be attached to either member 30, 32, both members 30, 32 or may be otherwise secured intermediate said members 30, 32 prior to expansion of the material 34. Preferably, the reinforcement material is attached to an inwardly facing surface 90, 92 of one of the walls 38 of one or both of the members 30, 32 wherein the surfaces 90, 92 are respectively generally opposite the contacting surfaces 50 of the first and second members 30, 32. In FIG. 2, the reinforcement material 34 is illustrated as attached to the inwardly facing surface 92 of one of the walls 38 of the second member 32.

Preferably, the reinforcement material is a high compressive strength heat activated reinforcement material having foamable characteristics. The material may be generally dry to the touch or tacky and can be placed intermediate the members 30, 32 in any form of desired pattern, placement, or thickness, but is preferably a substantially uniform thickness. One exemplary expandable material 34 is L-5204 structural foam available through L&L Products, Inc. of Romeo, Mich.

Though other heat activated materials are possible for the reinforcement material 34, a preferred heat activated material is an expandable plastic, and preferably one that is foamable. A particularly preferred material is an epoxy-based structural foam. For example, without limitation, the structural foam may be an epoxy-based material, including an ethylene copolymer or terpolymer that may possess an alpha-olefin. As a copolymer or terpolymer, the polymer is composed of two or three different monomers, i.e., small molecules with high chemical reactivity that are capable of linking up with similar molecules.

A number of epoxy-based structural reinforcing foams are known in the art and may also be used to produce the structural foam. A typical structural foam includes a polymeric base material, such as an epoxy resin or ethylene-based polymer which, when compounded with appropriate ingredients (typically a blowing and curing agent), expands and cures in a reliable and predicable manner upon the application of heat or the occurrence of a particular ambient condition. From a chemical standpoint for a thermally-activated material, the structural foam is usually initially processed as a flowable thermoplastic material before curing. It will cross-link upon curing, which makes the material incapable of further flow.

An example of a preferred structural foam formulation is an epoxy-based material that is commercially available from L&L Products of Romeo, Mich., under the designations L5206, L5207, L5208, L5209, XP321 and XP721. One advantage of the preferred structural foam materials over prior art materials is that the preferred materials can be processed in several ways. The preferred materials can be processed by injection molding, extrusion compression molding or with a mini-applicator. This enables the formation and creation of part designs that exceed the capability of most prior art materials. In one preferred embodiment, the structural foam (in its uncured state) generally is dry or relatively free of tack to the touch and can easily be attached to the members 30, 32 through fastening means which are well known in the art.

While the preferred materials for fabricating the reinforcement material 34 have been disclosed, the reinforcement material 34 can be formed of other materials provided that the material selected is heat-activated or otherwise activated by an ambient condition (e.g. moisture, pressure, time or the like) and cures in a predictable and reliable manner under appropriate conditions for the selected application. One such material is the epoxy based resin disclosed in U.S. Pat. No. 6,131,897, the teachings of which are incorporated herein by reference, filed with the United States Patent and Trademark Office on Mar. 8, 1999 by the assignee of this application. Some other possible materials include, but are not limited to, polyolefin materials, copolymers and terpolymers with at least one monomer type an alpha-olefin, phenol/formaldehyde materials, phenoxy materials, and polyurethane materials with high glass transition temperatures. U.S. Pat. Nos. 5,766,719; 5,755,486; 5,575,526; and 5,932,680, (incorporated by reference). In general, the desired characteristics of the structural foam include relatively high stiffness, high strength, high glass transition temperature (typically greater than 70 degrees Celsius), and good corrosion resistance properties. In this manner, the material does not generally interfere with the materials systems employed by automobile manufacturers.

In applications where the reinforcement material 34 is a heat activated, thermally expanding material, an important consideration involved with the selection and formulation of the material comprising the structural foam is the temperature at which a material reaction or expansion, and possibly curing, will take place. For instance, in most applications, it is undesirable for the material to be reactive at room temperature or otherwise at the ambient temperature in a production line environment. More typically, the structural foam becomes reactive at higher processing temperatures, such as those encountered in an automobile assembly plant, when the foam is processed along with the automobile components at elevated temperatures or at higher applied energy levels, e.g., during painting preparation steps. While temperatures encountered in an automobile assembly operation may be in the range of about 148.89° C. to 204.44° C. (about 300° F. to 400° F.), body and paint shop applications are commonly about 93.33° C. (about 200° F.) or slightly higher. If needed, blowing agent activators can be incorporated into the composition to cause expansion at different temperatures outside the above ranges.

Generally, suitable expandable foams have a range of expansion ranging from approximately 0 to over 1000 percent. The level of expansion of the structural foam 34 may be increased to as high as 1500 percent or more. Typically, strength is obtained from products that possess low expansion.

Some other possible materials include, but are not limited to, polyolefin materials, copolymers and terpolymers with at least one monomer type an alpha-olefin, phenol/formaldehyde materials, phenoxy materials, and polyurethane. U.S. Pat. Nos. 5,266,133; 5,766,719; 5,755,486; 5,575,526; 5,932,680; and WO 00/27920 (PCT/US 99/24795) (all of which are expressly incorporated by reference). In general, the desired characteristics of the resulting material include relatively low glass transition point, and good corrosion resistance properties. In this manner, the material does not generally interfere with the materials systems employed by automobile manufacturers. Moreover, it will withstand the processing conditions typically encountered in the manufacture of a vehicle, such as the e-coat priming, cleaning and degreasing and other coating processes, as well as the painting operations encountered in final vehicle assembly.

In another embodiment, the reinforcement material 34 is provided in an encapsulated or partially encapsulated form, which may comprise a pellet, which includes an expandable foamable material, encapsulated or partially encapsulated in an adhesive shell. An example of one such system is disclosed in commonly owned, co-pending U.S. application Ser. No. 09/524,298 ("Expandable Pre-Formed Plug"), hereby incorporated by reference.

In addition, as discussed previously, preformed patterns may also be employed such as those made by extruding a sheet (having a flat or contoured surface) and then die cutting it according to a predetermined configuration in accordance with the chosen pillar structure 12 or door beam, and applying it thereto.

The skilled artisan will appreciate that the system may be employed in combination with or as a component of a conventional sound blocking baffle, or a vehicle structural reinforcement system, such as is disclosed in commonly owned co-pending U.S. application Ser. No. 09/524,961 or 09/502,686 (hereby incorporated by reference).

During formation of the reinforced structural system 14, the reinforcing structural assembly 10 is typically placed within a cavity of an automotive vehicle for forming a reinforced structural system with one or more components of the automotive vehicle. As discussed, several components within an automotive vehicle may form cavities suitable for receiving a reinforcing structural assembly of the present invention.

In the exemplary embodiment shown in FIG. 4, the assembly 10 is placed between the battery support tray 16 and the metal panel 18 of the vehicle. The fastener 78 is extended through the opening 82 in the battery tray 16 to maintain the assembly 10 between the battery tray 16 and the metal panel 18 prior to expansion of the reinforcement material 34. Preferably, the assembly 10 is maintained in a position wherein the outwardly facing contacting surfaces 50 of the members 30, 32 are respectively facing toward surfaces of the battery tray 16 and the metal panel 18. Either, both or neither of the contacting surfaces 50 of the members 30, 32 may be in contact with the battery tray 16, and the metal panel 18 prior to expansion of the reinforcement material 34.

In a preferred embodiment, the members 30, 32, the components 16, 18 to which the members 30, 32 are attached or a combination thereof include an adhesive material for assisting in securing the assembly 10 to vehicular components. In the embodiments shown in FIGS. 1–6, each of the surfaces 50 of the members 30, 32 support an adhesive material 100, which is preferably formed in layers, for assisting in securing the assembly 10 between components 16, 18. The adhesive material 100 may be the same material as the reinforcement material 34 or may be different. Alternatively, the adhesive material 100 may be different than the reinforcement material 34 but may still be chosen from any one of the expandable materials described in relation to the reinforcement material 34. In still other alternatives, a variety of art known adhesives may be used as the adhesive material 100 and the adhesives may be generally expandable or non-expandable and may or may not be epoxy based.

As stated, the fasteners 60 that secure the members 30, 32 together are preferably configured to permit relative movement between the members 30, 32 both prior to and during expansion of the reinforcement material 34. The fasteners 60 may allow a variety of relative movement between the members 30, 32. The fasteners 60 may permit movement of the members 30, 32 generally toward and away from each other. Moreover, the movement toward and away from each other may be generally lateral with respect to each other, substantially directly toward and away from each other or a combination thereof.

Permitting such movement, especially prior to expansion of the reinforcement material 34 can assist with the placement of the assembly 10 into a cavity that the assembly might not otherwise fit into. For example, and referring to FIGS. 5(a)–5(b), the assembly 10 is illustrated as it is installed into a cavity 120. The components that form the cavity 120 define an opening 124 that is generally a shorter distance ($D_1$) across than a distance ($D_2$) across the cavity 120 that the assembly 10 is to span across when it is installed therein. Advantageously, the members 30, 32 may be moved toward each other allowing the assembly 10 to fit through the opening 124 It shall be appreciated that, although the assembly 10 has been shown with two members 30, 32 that are moveable relative to each other, more members may be added to the assembly 10, which may also be moveable relative to each other.

Figure 7A:
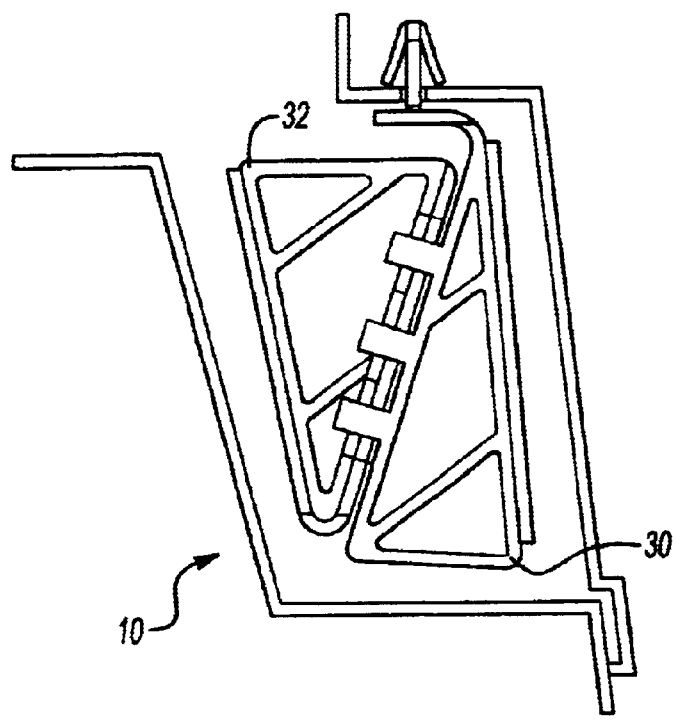
FIGS. 7(a)–7(b) are side views of the reinforced structural assembly of FIG. 1 being installed into another cavity of an automotive vehicle.
Figure 7B:
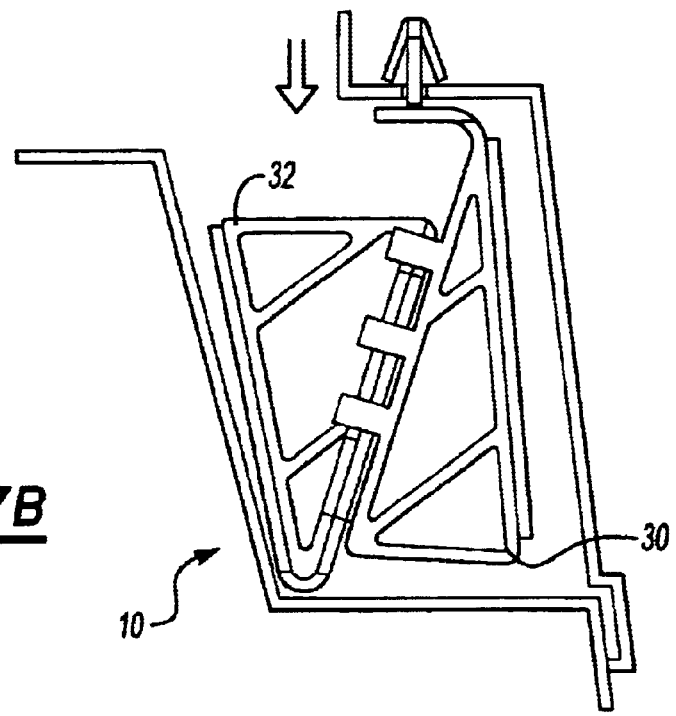

In alternative embodiments, the members 30, 32 may move laterally with respect to each other to assist in placement of the assembly 10 within a cavity such as a cavity with a higher and a lower portion. With the assembly 10 of FIGS. 1–4, the inwardly facing surfaces 90, 92 of the members 30, 32 are generally sloping at an angle with respect to the members 30, 32. Thus, when the members 30, 32 are moved laterally with respect to each other, the surfaces 90, 92 act as camming surfaces forcing the members to move at least partially in a direction directly toward or away from each other as well as laterally toward or away from each other. Such movement can generally assist the assembly 10 to extend into various levels of a cavity if such movement is desired or necessary. It shall be recognized however, that the inwardly facing surfaces 90, 92 of the members 30, 32 may be sloped at any desired angle or may not be sloped at all according to the present invention. With reference to FIGS. 7(a) and 7(b), the illustrative structural assembly 10 is placed within a cavity and one of the structural members 30, 32 is moved or mechanically adjusted at least partially laterally and partially directly away from the other of the members 30, 32.

Once the assembly 10 is in place, the reinforcement material 34, the adhesive materials 100 or both are activated (e.g., expanded using heat experienced during an e-coat process or other painting operation typically encountered in the production of automotive vehicles), such that the reinforcement material 34, the adhesive material 100 or both expand and adhere to walls or surfaces adjacent the materials 34, 100. The reinforcement material 34 typically adheres to the inwardly facing surfaces 90, 92 of the first and second members 30, 32 as it places force upon those surfaces 90, 92 tending to move the first and second members 30, 32 away from each other.

During expansion, the members 30, 32 are typically moved away from each other to promote connection of the outwardly facing surfaces 50 of the members 30, 32 with surfaces of adjacent components such as the battery tray 16 and the metal panel 18 thereby securing the assembly 10 between the components and forming the reinforcing system 14. Preferably, the adhesive materials 100 adhere to walls defining the cavity in which the assembly 10 has been placed. Thereafter, the reinforcement material 34, the adhesive materials 100 or both are cured (e.g., by cooling the materials 34, 100) to fully adhere the members 30, 32 to each other and to adjacent components.

Depending on the configuration of the fasteners 60, the fasteners 60 may continuously assist in securing the members 30, 32 together before and after expansion of the reinforcement material 34, or the fasteners 60 may be releasable such that the fasteners 60 discontinue securing the members 30, 32 together after expansion of the material 34. For example, when the fasteners 60 are tangs, the tangs 60 may be long enough to permit expansion of the reinforcement material 34 while maintaining the tangs in the cavities 68. Alternatively, the expandable material 34 may expand and create a large enough force to overcome the force that maintains the tangs 60 in the cavities 68 such that the tangs 60 are removed from the cavities 68.

Once the reinforcement material 34, the adhesive material 100 or both are substantially fully expanded and cured, the assembly 10 becomes rigid such that the system 14 includes one or more components (e.g., the battery tray 16 and the panel 18) rigidly connected by the assembly 10. Such connection can provide advantages such as providing structural reinforcement to various components and providing resistance to vibrations that are typically present in automotive vehicles.

Preferably, the reinforcement material 34 of the assembly 10 is more expandable than the adhesive materials 100 such that the assembly 10 can provide such structural properties and vibrational damping properties in a manner that respectively takes advantage of the properties of the adhesive materials 100 and the reinforcement material 34. Generally speaking, expandable reinforcement materials tend to provide greater structural reinforcement properties and vibrational damping properties when the materials are in compression and are used to absorb forces and vibrations causing compressive type stresses. On the other hand, reinforcement or adhesive materials that are less expanded or substantially non-expanded tend to provide greater structural reinforcement properties and vibrational damping properties against shear type stresses. Moreover, for structural reinforcements, compressive type stresses are typically more prevalent internally within the reinforcements while shear type stress are more prevalent at interfaces between reinforcements and components that the reinforcements are designed to reinforce.

Thus, the assembly 10 of the present invention is designed to place the reinforcement material 34 in compression between the members 30, 32 to absorb forces and vibrations, which cause compressive type stresses and because the reinforcement material 34 is operating in compression, it tends to perform well even though it may be more expanded than the adhesive materials 100. Additionally, the assembly 10 is designed to place the adhesive materials 100 at interfaces between the members 30, 32 and adjacent components to absorb forces and vibrations, which cause shear type stresses by placing the adhesive materials 100 between the members 30, 32 and walls of adjacent vehicular components where most of shear type forces are experienced by the assembly 10. Therefore, in highly preferred embodiments, the reinforcement material 34 is chosen such that it expands at least 5 times the expansion of one or both of the adhesive materials 100 and more preferably 10 times the expansion of one or both of the adhesive materials 100. Even more preferably, the reinforcement material 34 may expand while the adhesive material may be generally non-expandable.

As an additional advantage, having the adhesive material 100 less expandable than the reinforcement material 34 can also assist the assembly in adjusting to variably sized cavities. For example, components of vehicles typically have various tolerances that allow the components to vary in size, which, in turn, causes the cavities defined by those components to also vary in size. However, greater expandability of the reinforcement material 34 relative to the adhesive materials 100 assures that the reinforcement material 34 will expand more than the adhesive materials 100 to take up any excess cavity space that various component tolerances may create. Thus, the adhesive materials 100 will remain thinner or less expanded so that they will be effective at absorbing shear stresses and even though the reinforcement material 34 may be more expanded if cavity sizes become larger, the material 34 will remain effective at reinforcing against compression type stresses since it is in compression between the members 30, 32.

Figure 6:
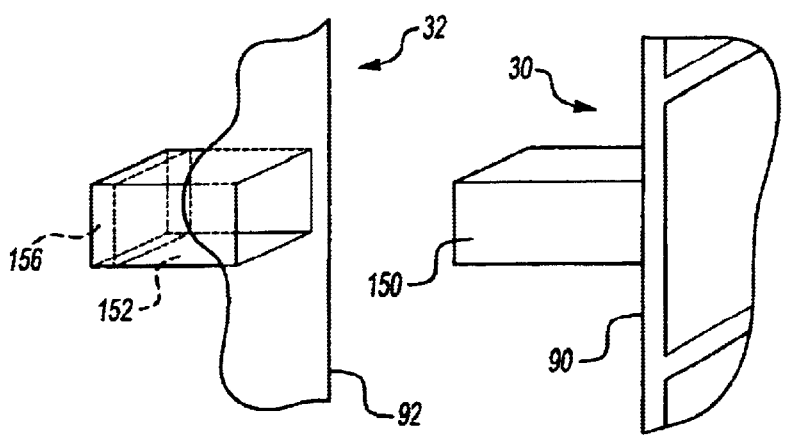
FIG. 6 is a partially cut away perspective view of a portion of an alternative embodiment of a reinforced structural assembly according to a non-limiting aspect of the present invention.
Figure 5A:
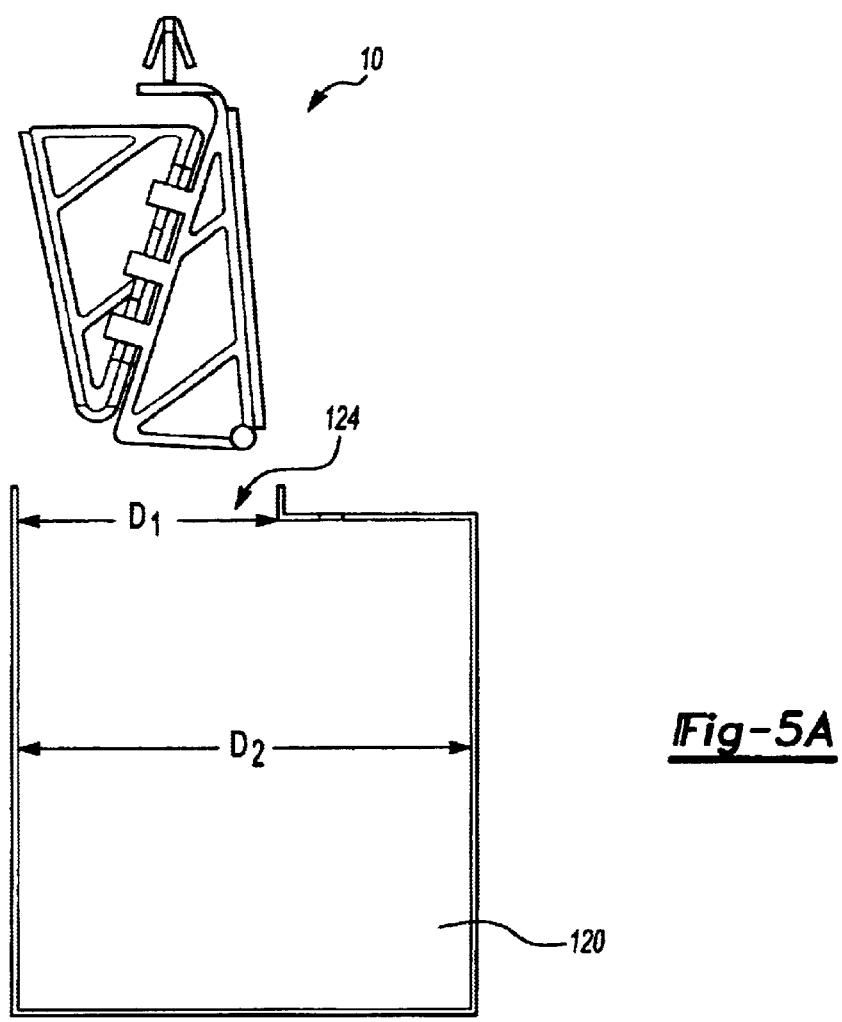
FIGS. 5(a)–5(b) are side views of the reinforced structural assembly of FIG. 1 being installed into another cavity of an automotive vehicle.
Figure 5B:
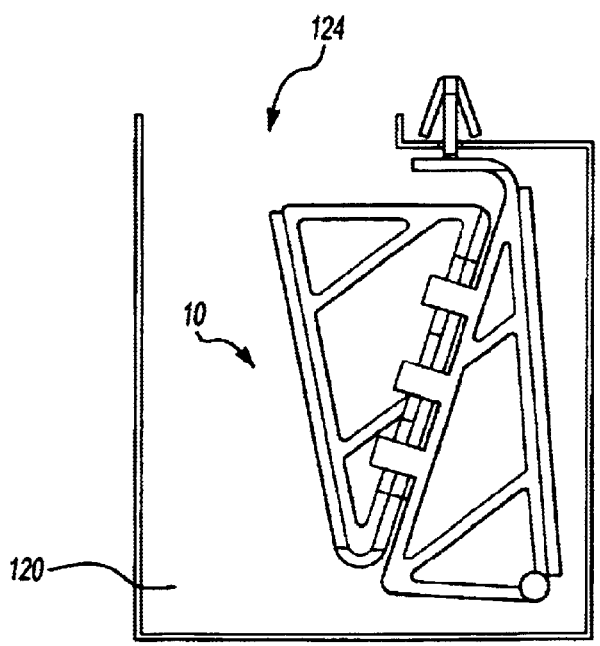

In preferred alternative embodiments, the members 30, 32 may include one or more cavities formed therein for assisting in controlling the expansion of at least a portion of the reinforcement material. With reference to FIG. 6, an exemplary alternative embodiment of a portion of the members 30, 32 is shown. One of the members 30, 32 includes a protrusion 150 extending away from the inwardly facing surface 90 of the member 30 while the other of the members 30, 32 includes a cavity 152 defined within its inwardly facing surface 90. As shown a portion 156 of the reinforcement material has been placed within the cavity 152.

Advantageously, the protrusion 150 can be slidably or adjustably (and preferably matingly) fit within the cavity 152 allowing the same type of adjustability as that offered by the tangs 60 in FIGS. 2 and 4. Moreover, the protrusion 150 and walls defining the cavity 152 can confine the expansion of the portion 156 of reinforcement material such that the portion 156 substantially expands only in a direction that moves the members 30, 32 apart as previously described. By confining the expansion, the portion 156 of reinforcement material in the cavity 152 may provide greater movement of the members 30, 32 apart and can place the portion 156 of the reinforcement material under greater compression thereby taking advantage of the reinforcement properties of the portion 156.

Figure 8A:
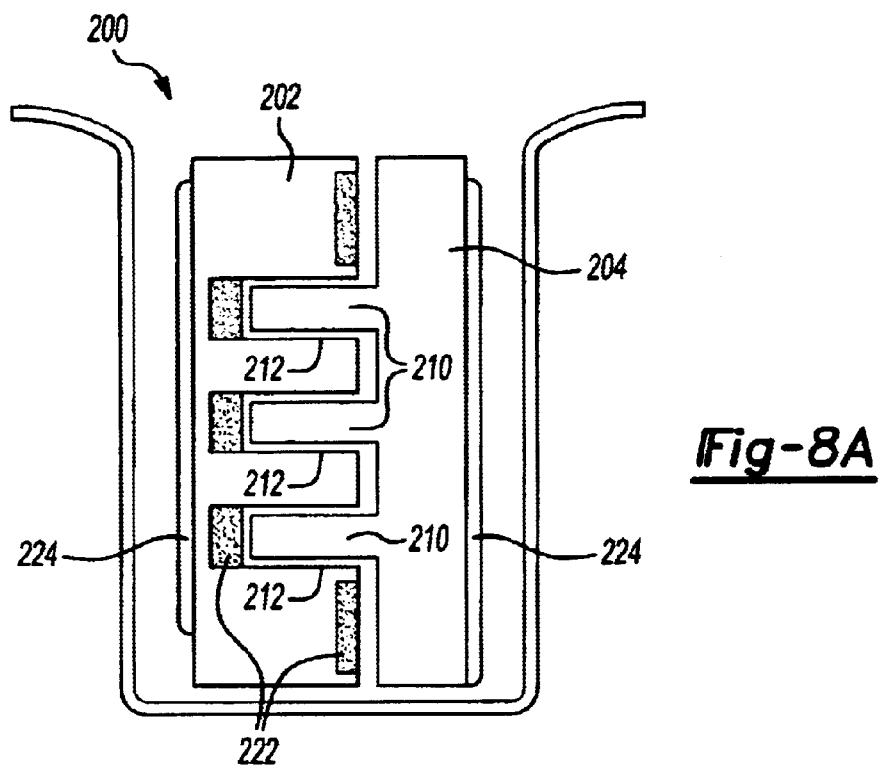
FIGS. 8(a)–8(b) are side sectional views of an alternative reinforced structural assembly being installed into another cavity of an automotive vehicle.
Figure 8B:
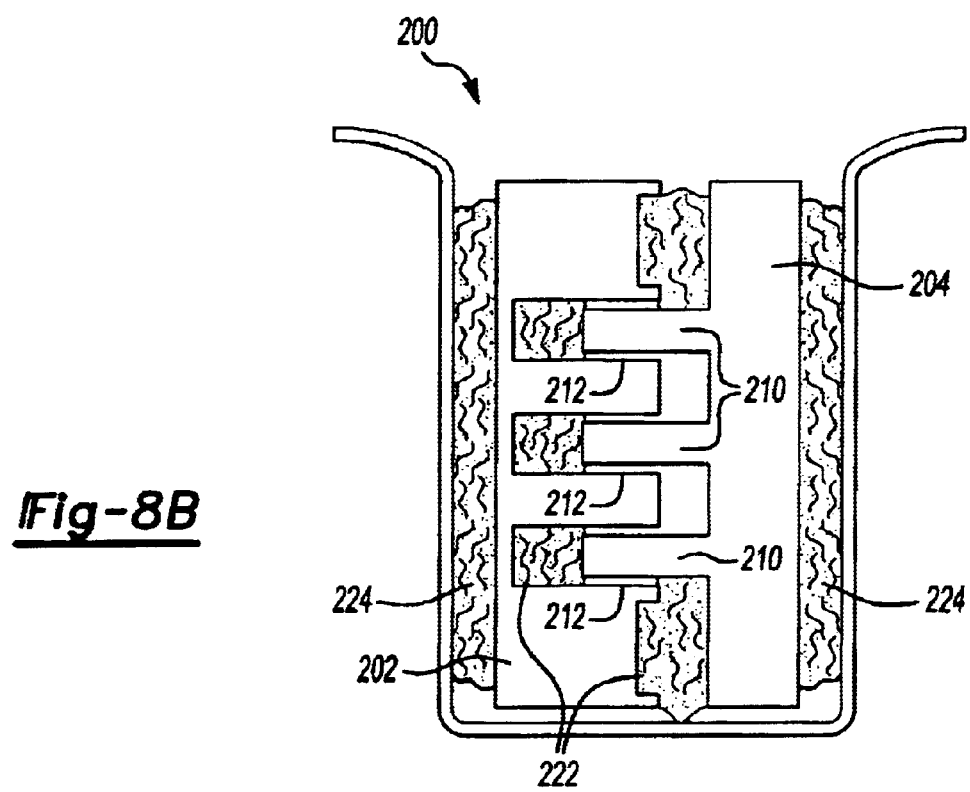

It should be understood that more than one protrusion and one cavity may be used as desired and that the protrusion and cavity may be sized and shaped as desired. Moreover the protrusion and cavity may be configured or angled relative the members 30, 32 such that the members 30, 32 may move straight away from each other or away from each other at an angle. As another example, FIGS. 8(a)–8(b) illustrate a structural assembly 200 with generally block-shaped structural members 202,204 and three protrusion 210/cavity 212 combinations. In FIG. 8(a), the assembly 200 is shown inserted into a cavity prior to expansion of reinforcement material 222 and adhesive material 224. In FIG. 8(b), the assembly 200 is shown after expansion of the reinforcement material 222 and adhesive material 224 to secure the assembly 200 in the cavity.

In other alternative embodiments, it is contemplated that the structural assembly according to the present invention may not include adhesive material and may only include reinforcement material between members. In such embodiments, it is preferable to use alternative mechanisms for attaching the assembly to walls defining a cavity. For example, the members of the assembly may include flat or contoured surfaces designed to matingly fit against walls defining a cavity or the members may include fasteners to assist in securing the members to wall defining a cavity.

In addition to those mentioned above, a number of other advantages may also be realized in accordance with the present invention. The assembly is a lightweight reinforcement due to the skeletal structure of the members of the assembly. Additionally, the assembly can reinforce components of vehicles across relatively large cavities without having to use large sums of expandable material due to the positioning of the members relative to the expandable material. Still other advantages may also be recognized by those of skill in the art.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. A reinforced structural assembly adapted for placement in a cavity of an automotive vehicle, comprising:
   (a) a first member having a first surface generally opposing a second surface;
   (b) a second member having a first surface generally opposing a second surface;
   (c) a reinforcement material intermediate the first member and the second member, the reinforcement material configured for contacting the first surfaces of the first and second members during expansion of the reinforcement material hereby promoting connection of the second surfaces of the first and second members with a first and second surface that at least partially define the cavity, wherein:
      i. the first member is formed of a first material different from the reinforcement material;
      ii. the second member is formed of a second material different from the reinforcement material;
      iii. the first material is the same or different from the second material; and
      iv. the first material and the second material include at least one of a plastic material, a polymeric material, a metal material or a combination thereof; and
   (d) an adhesive material configured to assist the second surfaces of the first and second members in adhering to the first and second surfaces that at least partially define the cavity.

2. The assembly as claimed in claim 1, wherein the first surface that at least partially defines the cavity is part of a battery support tray.

3. The assembly as claimed in claim 2, wherein the second surface that at least partially defines said cavity is part of a metal panel of the vehicle.

4. The assembly as claimed in claim 1, wherein the first and second surface that at least partially define the cavity are both part of a single component.

5. The assembly as claimed in claim 1, wherein the first and second member are generally wedge shaped.

6. The assembly as claimed in claim 1, wherein the first member includes a protrusion extending away from the first surface of the first member.

7. The assembly as claimed in claim 6, wherein the second member includes cavity at least partially defined in the first surface of the second member, the cavity of the second member configured for receiving the protrusion while said reinforcement material is in its pre-expanded state and the cavity of the second member having therein at least a portion of the reinforcement material.

8. The assembly as claimed in claim 1, wherein at least one of the first and second members includes a fastener for assisting in maintaining the assembly in the cavity of the vehicle prior to expansion of said reinforcement material.

9. The assembly as claimed in claim 1, wherein the reinforcement material is configured to experience greater expansion than the adhesive material.

10. A reinforced battery support tray system of an automotive vehicle, comprising:
    (a) a battery support tray for assisting in positioning a battery of an automotive vehicle, the battery tray having a surface;
    (b) a metal panel of the automotive vehicle, the metal panel having a surface; and
    (c) a reinforced structural assembly including;
       i) a first member for connecting to the surface of the battery tray;
       ii) a second member for connecting to the surface of the metal panel; and
       iii) a reinforcement material intermediate the first and second member for expanding to promote connection of the first member with the battery tray and the second member with the panel;
       iv) adhesive material disposed upon said first member and said second member to promote connection of the first member with the battery tray and the second member with the panel.

11. The system as claimed in claim 10, wherein the first and second members are generally wedge shaped in cross-section.

12. The system as claimed in claim 10, wherein the first member includes a protrusion extending away from the first surface of the first member.

13. The system as claimed in claim 12, wherein the second member includes a cavity at least partially defined in the first surface of the second member, the cavity of the second member configured for receiving the protrusion while said reinforcement material is in its pre-expanded state and the cavity of the second member having therein at least a portion of the reinforcement material.

14. The system as claimed in claim 10, wherein at least one of the first and second members includes a fastener for assisting in maintaining the assembly in the cavity prior to expansion of said reinforcement material.

15. The system as claimed in claim 10, wherein the reinforcement material is configured to experience greater expansion than the adhesive material.

16. A method of reinforcing one or more components of an automotive vehicle, the one or more components having a first surface and a second surface at least partially defining a cavity, the method comprising:
    (a) providing a reinforced structural assembly having a first member, a second member and reinforcement material intermediate the first and second members and adhesive material on outwardly facing surfaces of the first and second members, wherein:
       i. the first member is formed of a first material different from the reinforcement material;
       ii. the second member is formed of a second material different from the reinforcement material;
       iii. the first material is the same or different from the second material; and
       iv. the first material and the second material include at least one of a plastic material, a polymeric material, a metal material or a combination thereof; and
    (b) positioning the reinforced structural assembly within the cavity of the automotive vehicle such that the outwardly facing surface of the first member opposes the first surface that at least partially defines the cavity and the outwardly facing surface of the second member opposes the second surface that at least partially defines the cavity;
    (c) expanding the reinforcement material to promote connection between the outwardly facing surface of the first member and the first surface that at least partially defines the cavity and to promote connection between the outwardly facing surface of the second member and the second surface that at least partially defines the cavity, wherein said adhesive material assists in adhering the first and second members to the first and second surfaces that at least partially define the cavity.

17. The method as claimed in claim 16, wherein the first and second members are generally wedge shaped in cross-section.

18. The method as claimed in claim 16, wherein the first member includes a protrusion extending away from the first member.

19. The method as claimed in claim 18, wherein the second member includes a cavity at least partially defined in the second member, the cavity of the second member configured for receiving the protrusion while said reinforcement material is in its pre-expanded state and the cavity of the second member having therein at least a portion of the reinforcement material.

20. The method as claimed in claim 16, wherein the reinforcement material is configured to experience greater expansion than the adhesive material.

* * * * *

UNITED STATES PATENT AND TRADEMARK OFFICE
CERTIFICATE OF CORRECTION

PATENT NO.     : 6,729,425 B2
DATED          : May 4, 2004
INVENTOR(S)    : Dean Jeffrey Schneider et al.

Page 1 of 1

It is certified that error appears in the above-identified patent and that said Letters Patent is hereby corrected as shown below:

Column 11,
Line 55, replace "includes cavity" with -- includes a cavity --

Signed and Sealed this

Tenth Day of August, 2004

JON W. DUDAS
*Acting Director of the United States Patent and Trademark Office*